US010911086B2

(12) United States Patent
Hammerschmidt et al.

(10) Patent No.: US 10,911,086 B2
(45) Date of Patent: Feb. 2, 2021

(54) RECEIVER, METHOD FOR DETECTING AN ERROR IN A SIGNAL COMPRISING A DATUM, METHOD FOR TRANSMITTING A DATUM AND A METHOD FOR DETECTING AN ERROR IN A SIGNAL

(71) Applicant: Infineon Technologies AG, Neubiberg (DE)

(72) Inventors: Dirk Hammerschmidt, Villach (AT); Wolfgang Scherr, Villach (AT)

(73) Assignee: Infineon Technologies AG, Neubiberg (DE)

( * ) Notice: Subject to any disclaimer, the term of this patent is extended or adjusted under 35 U.S.C. 154(b) by 371 days.

(21) Appl. No.: 14/802,439

(22) Filed: Jul. 17, 2015

(65) Prior Publication Data
US 2016/0020797 A1 Jan. 21, 2016

(30) Foreign Application Priority Data

Jul. 17, 2014 (DE) .......................... 10 2014 110 082

(51) Int. Cl.
*H04B 1/16* (2006.01)
*H04L 25/06* (2006.01)
(Continued)

(52) U.S. Cl.
CPC .............. *H04B 1/16* (2013.01); *H04B 17/21* (2015.01); *H04L 25/069* (2013.01); *H04L 25/4902* (2013.01); *H04L 1/0061* (2013.01)

(58) Field of Classification Search
CPC ...................................................... H04L 12/26
See application file for complete search history.

(56) References Cited

U.S. PATENT DOCUMENTS 5,315,299 A * 5/1994 Matsumoto ........... H03M 5/145
341/53
5,621,758 A * 4/1997 Suzuki .................... H03M 5/08
327/31
(Continued)

FOREIGN PATENT DOCUMENTS

DE 19849408 A1 5/2000
DE 102008064747 B3 12/2012
DE 102012023350 A1 6/2013

OTHER PUBLICATIONS

Office Action issued for DE 10 2014 110 082.4, 7 pgs., German Patent Office, dated Mar. 30, 2015.
(Continued)

Primary Examiner — Jaison Joseph
(74) Attorney, Agent, or Firm — Schiff Hardin LLP

(57) ABSTRACT

A receiver according to an embodiment includes a receiver circuit to receive a transition in a first direction, a second transition after the first transition in a second direction, and a third transition after the second transition in the first direction and a fourth transition in the second direction of a signal. The receiver circuit is adapted to determine a first time period between the first and third transitions and to determine a second time period between the second and fourth transitions. The receiver circuit is adapted to determine a datum based on at least one of the first time period and the second time period. Furthermore, the receiver is adapted to indicate an error, if the determined first and second time periods do not fulfil a predetermined verification relationship.

10 Claims, 16 Drawing Sheets

(51) Int. Cl.
*H04L 25/49* (2006.01)
*H04B 17/21* (2015.01)
*H04L 1/00* (2006.01)

(56) References Cited

U.S. PATENT DOCUMENTS

| | | | | |
|---|---|---|---|---|
| 6,513,831 | B2 * | 2/2003 | Stierle | B60R 21/01 |
| | | | | 280/734 |
| 6,550,036 | B1 * | 4/2003 | Panis | G01R 31/31937 |
| | | | | 324/76.44 |
| 8,207,877 | B2 * | 6/2012 | Ha | H03M 1/504 |
| | | | | 341/100 |
| 2010/0002821 | A1 * | 1/2010 | Hammerschmidt | H04L 7/10 |
| | | | | 375/360 |
| 2013/0094373 | A1 * | 4/2013 | Reidl | H04L 25/4902 |
| | | | | 370/252 |
| 2013/0343472 | A1 | 12/2013 | Scherr | |
| 2014/0036987 | A1 * | 2/2014 | Kashima | H03K 7/08 |
| | | | | 375/238 |

OTHER PUBLICATIONS

SAE International, "Surface Vehicle Information Report", Mar. 2010, 103 pgs.
Freescale Seminconductor, "SENT/SPC Driver for the MPC5510 Microcontroller Family", 2010, 28 pgs.

* cited by examiner

RECEIVER, METHOD FOR DETECTING AN ERROR IN A SIGNAL COMPRISING A DATUM, METHOD FOR TRANSMITTING A DATUM AND A METHOD FOR DETECTING AN ERROR IN A SIGNAL

FIELD

Embodiments relate to a receiver, a method for detecting an error in a signal comprising a datum, a method for transmitting a datum, a method for detecting an error in a signal and corresponding computer-, processor- and programmable hardware-related implementations.

BACKGROUND

In many fields of technology, data are transmitted from one entity to another entity using a digital encoding scheme. While in many applications highly sophisticated transmission schemes are employed, in some fields a tendency exists to allow less complex components of a system to transmit or even exchange data via a robust protocol allowing both, a high throughput and a simple implementation or architecture. As a consequence, in many fields the challenge exists to balance these partially contradicting design goals to obtain a solution best suited for the specific application.

For instance, in the field of high volume architectures and low cost implementations, finding a solution to this challenge may be more relevant than in other fields of technology. To name an example, in communication systems for motorized or non-motorized vehicles, different components including sensors, control units and other devices are often required to communicate with one another in an environment subjected to tough operating conditions and a large number of distortions of different kinds. Distortions may, for instance, come from electric impulses used to operate systems of the vehicle. These distortions may, for instance, couple capacitively into such a communication system based on electrical signals. The situation may further be aggravated by environmental conditions that may lead to a signal degradation caused, for instance, by the influence of water. For instance, in the automotive sector, sensors and other devices communicate with a control unit or with one another.

However, these challenges do not only arise when using electrical signals, but also magnetic signals, optical signals or other signals to transmit or exchange information and data. Furthermore, in other fields of technology, comparable situations often exist including in non-high volume architectures and systems and/or non-low cost applications.

SUMMARY

Therefore, a demand exists to improve a trade-off between robustness with respect to distortions, a simple implementation of the architecture and a high throughput of data.

This demand may be satisfied by a receiver, a method for detecting an error in a signal comprising a datum, a method for transmitting a datum, a method for detecting an error signal and corresponding computer-, processor- or programmable hardware-related implementations according to any of the independent claims.

A receiver according to an embodiment comprises a receiver circuit to receive a pulse width encoded signal having a transition in a first direction, a second transition after the first transition in a second direction, and a third transition after the second transition in the first direction and a fourth transition in the second direction of a signal. The receiver circuit is further adapted to determine a first time period between the first and third transitions and to determine a second time period between the second and fourth transitions. The receiver circuit is also adapted to determine a datum based on at least one of the first time period and the second time period. The receiver is further adapted to indicate an error, if the determined first and second time periods do not fulfil a predetermined verification relationship.

A receiver according to an embodiment may allow improving the previously described trade-off between a high throughput of data, a simple architecture and a robustness of a signal transmission with respect to distortions by implementing in a comparably simple way an error detecting mechanism allowing an additional and easy way to detect distortions. As a consequence, it may be possible to increase an operational safety of a system comprising such a receiver by allowing a more easy detection of errors in a signal comprising a datum.

Optionally, the receiver may be adapted to indicate the error by generating an error signal indicating the error. Generating the error signal may, for instance, comprise generating an electrical signal, an optical signal, a magnetic signal or a similar signal. For instance, generating the error signal may comprise writing an error message, a status or a similar datum to a storage location accessible by another component of a circuit or system comprising the receiver or a component of the receiver itself. For instance, the receiver may comprise an error detection circuit adapted to indicate the error, if the determined first and second time periods do not fulfil the predetermined verification relationship. Similarly, the error detection circuit may be adapted to generate the error signal, to name an example. The receiver circuit and the error detection circuit may be different circuits, but may also share one or more components. The receiver circuit and the error detection circuit may even comprise essentially the same circuits, for instance, a programmable hardware component, to name an example.

Additionally or alternatively, the receiver may be adapted such that the predetermined verification relationship is fulfilled, when a ratio of the determined first time period with respect to the determined second time period assumes a predetermined ratio value or false within a predetermined range of ratios. This may allow a comparably simple implementation, without sacrificing a throughput of data while increasing the robustness of the signal transmission.

Additionally or alternatively, the error detection circuit may be adapted such that the predetermined verification relationship is fulfilled, when the first transition and second time periods are essentially equal. This verification relationship may be especially simple to implement, which may not only represent a cost-efficient implementation, but may also increase operational safety by avoiding complex circuitry. The time periods may be essentially equal, when, for instance, within an accuracy of the capabilities of the receiver circuit to determine the respective time periods, the time periods are identical or if a difference between the determined time periods does not exceed a predetermined accuracy range.

Additionally or alternatively, the receiver circuit may be adapted to determine the first time period based on the first and third transitions as transitions from a common predefined first signal level to a common predefined second signal level. Additionally or alternatively, the receiver circuit may be adapted to determine the second time period based on the second and fourth transitions as transitions from a common predefined second signal level to a common predefined first signal level. By implementing any of these options, it may be possible to even further simplify the architecture by using predefined signal levels to determine the transitions. This may positively affect not only the precision of the determination of the respective time periods but also increase a reliability of a distortion detection.

Additionally or alternatively, the receiver circuit may be adapted to determine the datum by processing the at least one respective time period, which is variable and depending on the datum. In other words, the datum encoded in the respective time period between at least one of the first and third transitions and the second and the fourth transitions may change depending on the datum to be transmitted or received.

Additionally or alternatively, the receiver circuit may be adapted to determine the at least one respective time period with a higher precision than a size of a quantization step used by the receiver circuit to determine the datum based on the at least one respective time period. This may further improve the robustness with respect to distortions since distortions may eventually be more easily detectable.

As an additional or an alternative option, the receiver may be adapted to not indicate an error, if the first and second time periods fulfill the predetermined verification relationship. In other words, the error signal does not indicate an error or a distortion, if the receiver does not detect an error.

Additionally or alternatively, the receiver may be adapted to receive at least one of the second transition directly after the first direction, the third transition directly after the second transition and the fourth transition directly after the third transition.

Additionally or alternatively, the receiver circuit may be adapted to determine a time basis for determining at least one of the first and second time periods based on a synchronization frame received before receiving the first, second, third and fourth transitions. This may allow establishing a common time basis allowing an asynchronous transmission of the datum without implementing a clock fully synchronized with the transmitter on the receiver side. The synchronization frame may, for instance, comprise a pulse with a predetermined length in terms of a quantization used for determining at least one of the first and second time periods. The predetermined length may be defined according to a specification to comprise a plurality of ticks or bit times. For instance, an integer number of at least 10, at least 20, or at least 30 ticks may be used as the number of ticks corresponding to the predetermined length.

A transmitter according to an embodiment comprises a transmitter circuit to determine a first time period and a second time period based on a datum to be transmitted and based on a predetermined verification relationship between the first and second time periods. The transmitter circuit is further adapted to generate a signal comprising a first transition in a first direction, a second transition after the first transition in a second direction, a third transition after the second transition in the first direction and the fourth transition in the second direction of the signal. The first transition and the third transition are separated from another by the first time period, while the second transition and the fourth transition are separated from one another by the second time period. As outlined before, using the transmitter according to an embodiment may allow the previously mentioned trade-off to be improved.

A receiver according to an embodiment comprises a receiver circuit to receive a pulse width encoded signal having a first transition in a first direction and a second transition after the first transition in a second direction in a signal. The receiver circuit is adapted to determine a duration between the first transition and the second transition. The receiver is further adapted to generate an error indicating error signal, if a predetermined value and the determined duration essentially deviate from another.

Using a receiver according to an embodiment may also enable the trade-off previously mentioned may be improved by allowing another additionally or alternatively implemented verification of the duration between two transitions in opposite directions to determine whether a distortion might have influenced the signal. As outlined before, also this implementation may allow a simple implementation, especially when a datum to be transmitted is also encoded in a time period between two transitions.

Optionally, the receiver may be adapted to indicate the error by generating an error signal indicating the error. Generating the error signal may, for instance, comprise generating an electrical signal, an optical signal, a magnetic signal or a similar signal. For instance, generating the error signal may comprise writing an error message, a status or a similar datum to a storage location accessible by another component of a circuit or system comprising the receiver or a component of the receiver itself. For instance, the receiver may comprise an error detection circuit adapted to indicate the error, if the predetermined value and the determined duration essentially deviate from another. Similarly, the error detection circuit may be adapted to generate the error signal, to name an example. The receiver circuit and the error detection circuit may be different circuits, but may also share one or more components. The receiver circuit and the error detection circuit may even comprise essentially the same circuits, for instance, a programmable hardware component, to name an example.

Additionally or alternatively, the predetermined value may be fixed, changeable or programmable. For instance, the receiver may be adapted to obtain the predetermined value by reading the value from a storage location. This may allow adapting the receiver to its specific field of application. However, the predetermined value may also be fixed or unchangeable in some applications.

Additionally or alternatively, the predetermined value may be based on a calibration. This may allow the receiver to be directly adapted to the system comprising the receiver. As a consequence, it may be even possible to increase an accuracy of detecting a distortion or an error due to the calibration.

Optionally, the receiver may be adapted to at least one of calibrate and re-calibrate the predetermined value during operation of a receiver. This may, for instance, allow an easier implementation of a receiver in more complex system since a calibration may eventually be omittable before starting the operation of a system. Additionally or alternatively, the accuracy of detecting a distortion or error in the signal may further be improved since the receiver may be capable of adjusting itself to changing operational parameters and conditions.

Optionally, the receiver may be adapted to at least one of calibrate and re-calibrate that predetermined value by a low pass filter. Using a low pass filter may allow an adaptation of the predetermined value without sacrificing the possibility of detecting an abrupt change of the timing of the transitions caused, for instance, by a distortion. For instance, a moving average filter or another FIR filter (finite impulse response filter) may be used. However, also other averaging filters may be implemented, for instance, in the form of an infinite impulse response (IIR) filter, or an accumulate-and-dump decimation FIR filter. Furthermore, nonlinear filters like a tracking filter may be used, which allow slewing updates by (+1) or (−1) step only.

Optionally, the low pass filter may comprise a long-time decimating average filter taking at least $2^n$ transitions into account, wherein n is an integer larger than 4, 5, 6, 7, 8, 9 or 10. The longer the long-time moving average filter is (larger n), the more accurate determining distortions in the timing of the transitions may be detectable. However, correspondingly the time before the error detection circuit operates reliably may increase. For instance, implemented as a decimating filter it may be possible to realize a hardware efficient filter.

Additionally or alternatively, the receiver circuit may be adapted to receive a third transition in a first direction, to determine a first time period between the first and third transitions and to determine a datum to be received on the determined first time period. In such an implementation detecting an error as previously described may represent a simple extension of the already present architecture. As a consequence, implementing a receiver according to an embodiment may be done comparably simple.

Additionally or alternatively, the receiver circuit may be adapted to determine the datum by processing the at least one respective time period, which is variable and depending on the datum. In other words, also in this case the receiver circuit may be capable of receiving and processing data, which change over time and which are encoded in the respective time period between the mentioned transitions.

Optionally, the receiver circuit may be adapted to determine the duration based on a higher precision than a size of a quantization step used by the receiver circuit to determine the datum based on the respective time period. This may allow an even more accurate determination of distortions and errors in the signal.

Additionally or alternatively, the receiver circuit may be adapted to receive a third transition in the first direction and a fourth transition in the second direction after the third transition and to determine a further duration between the third and fourth transitions. The receiver may be adapted to indicate the error, if the determined further duration and the predetermined value or a further predetermined value essentially deviate from one another. When the datum to be transmitted is encoded in the time period between two transitions in the same direction such as the first or second direction, errors or distortions in the signal may be more easily determined by not just checking one period but two periods. Depending on the implementation, the durations determined may be compared to the same predetermined value or to different predetermined values. In the case of two different predetermined values used, which may in terms of the actual value still be identical, the further predetermined value may be implemented similar to the predetermined value, for instance, being based on a calibration. However, the receiver is by far not required to treat the predetermined value and the further predetermined value identically. For instance, just one of them may be calibratable or re-calibratable during operation of a receiver. It should be noted that the receiver may optionally be adapted to receive the third transition after the second transition and/or directly after the second transition. Similarly, the receiver circuit may be adapted to receive at least one of the second transition after the first direction and the second transition directly after the first direction.

Additionally or alternatively, the receiver circuit may be adapted to determine a time basis for determining the duration between the first and second transitions based on a synchronization frame received before receiving the first and second transitions. This may allow establishing a common time basis allowing an asynchronous transmission of the datum without implementing a clock fully synchronized with the transmitter on the receiver side. The synchronization frame may, for instance, comprise a pulse with a predetermined length in terms of a quantization used for determining at least one of the first and second time periods. The predetermined length may be defined according to a specification to comprise a plurality of ticks or bit times. For instance, an integer number of at least 10, at least 20, or at least 30 ticks may be used as the number of ticks corresponding to the predetermined length.

The receiver may be adapted to not indicate an error, if the predetermined value and the determined duration do not essentially deviate from one another, in case only the duration is determined. In the case the duration and the further duration are determined, the receiver may be adapted to not indicate an error, if the predetermined value and the determined duration as well as the further duration and the predetermined value or the further predetermined value do not essentially evaluate from one another. In other words, the error signal may not indicate an error or a distortion, when the receiver does not detect an error.

Moreover, embodiments also comprise a method for detecting an error in a signal comprising a datum. The method comprises receiving a first transition in a first direction, a second transition after the first transition in the second direction, a third transition after the second transition in the first direction and the fourth transition in the second direction of the signal. The method further comprises determining a first time period between the first and third transitions, determining a second time period between the second and fourth transitions, determining the datum to be received based on at least one of a first time period and a second time period, and indicating an error, if the determined first and second time periods do not fulfil a predetermined verification relationship.

Embodiments further comprise a method for transmitting a datum, wherein the method comprises determining a first time period and a second time period based on the datum to be transmitted and based on a predetermined verification relationship between the first and second time periods. The method further comprises generating a a pulse width encoded signal comprising a first transition in a first direction, a second transition after the first transition in a second direction, a third transition after the second transition in the first direction and the fourth transition in the second direction of the signal, wherein the first transition and the third transition are separated from one another by the first time period and wherein the second transition and the fourth transition are separated from one another by the second time period.

Furthermore, embodiments also comprise a method for detecting an error in a a pulse width encoded signal. The method comprises receiving a first transition in a first direction and a second transition after the first transition in a second direction in the signal, determining a duration between the first and second transitions and generating an error indicating error signal, if a predetermined value and the determined duration essentially deviate from one another.

Furthermore, embodiments also comprise a transmitter comprising a transmitter circuit to generate a a pulse width encoded signal comprising a first transition in a first direction and a second transition after the first transition in a second direction, wherein the first transition and the second transition is separated by a duration, which is essentially equal to a predetermined value.

Moreover, embodiments also comprise a computer program having a program code for performing any of the methods, when the computer program is executed on a computer, a processor or another programmable hardware.

Although in the previous sections different embodiments of receivers and transmitters have been described along with corresponding methods, an embodiment of a transmitter and/or of a receiver may implement features and options of more than one of the previously mentioned embodiments. In other words, an implementation of the corresponding circuit may represent more than just one embodiment of the transmitters and receivers described above. For instance, an implementation may be capable of sending and receiving data and, hence, here refer to as a transceiver. In such a case the receiver circuit and well as the transmitter circuit may share one or more components. In principle, depending on the implementation, the transmitter and receiver circuits may even be identical in some implementations.

Accordingly, embodiments also comprise a communication system comprising at least one receiver and/or at least one transmitter. The receiver or receivers as well as the transmitter may be implemented as embodiments. For instance, embodiments also comprise a vehicle such as a car comprising such a communication system.

BRIEF DESCRIPTION OF THE DRAWINGS

Several embodiments of the present invention will be described in the enclosed Figures.

DETAILED DESCRIPTION

Figure 1:
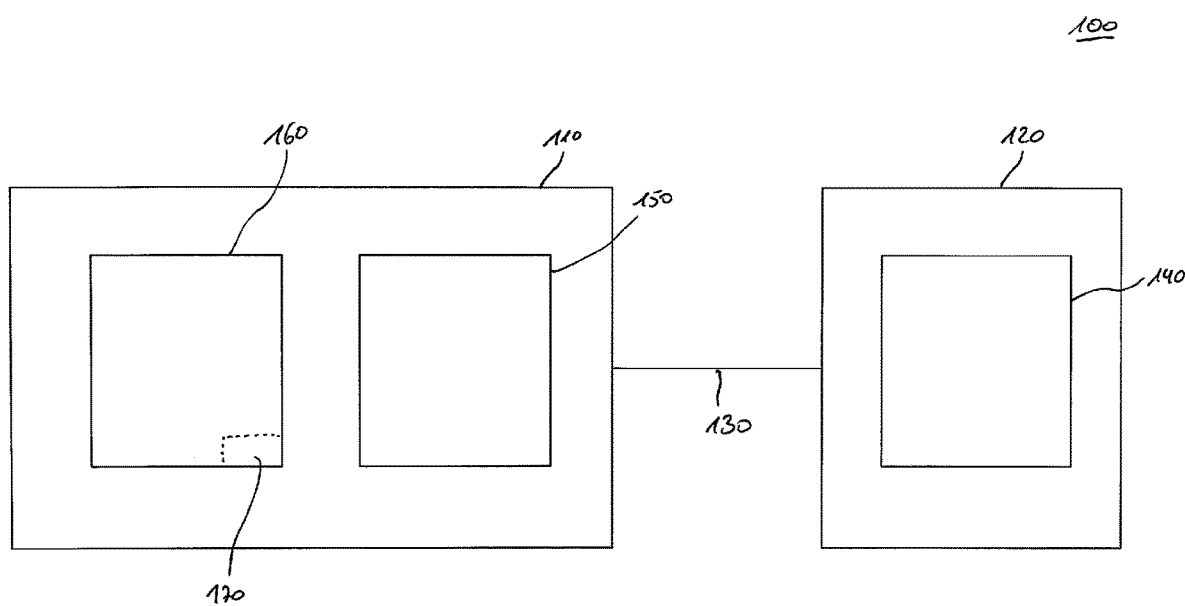
FIG. 1 shows a simplified block diagram of a communication system according to an embodiment.

In the following, embodiments according to the present invention will be described in more detail. In this context, summarizing reference signs will be used to describe several objects simultaneously or to describe common features, dimensions, characteristics, or the like of these objects. The summarizing reference signs are based on their individual reference signs. Moreover, objects appearing in several embodiments or several figures, but which are identical or at least similar in terms of at least some of their functions or structural features, will be denoted with the same or similar reference signs. To avoid unnecessary repetitions, parts of the description referring to such objects also relate to the corresponding objects of the different embodiments or the different figures, unless explicitly or—taking the context of the description and the figures into account—implicitly stated otherwise. Therefore, similar or related objects may be implemented with at least some identical or similar features, dimensions, and characteristics, but may be also implemented with differing properties.

In many fields of technology, the challenge exists to allow entities in components to communicate with one another using digital protocols in a reliable, efficient and yet simple way. The challenge to balance the possible throughput of data, a simple architecture and implementation as well as a robustness against distortions, that may come from the system comprising the components but also from its environment, may be of more or less importance in different applications.

For instance, in high volume and low cost application the challenge to find simple solutions providing a sufficient throughput for data in combination with a sufficient robustness against distortions may be decisive in terms of acceptance for the corresponding products. A way to improve the robustness against distortions is to enable a receiver to detect the presence of a distortion leading to an error in the communication.

Distortions may come from different sources including the component itself. For instance, in the case of an electrical transmission scheme, distortions may capacitively couple into the communication link. Similarly, influences by the environment may lead to a signal degradation and, hence, to susceptibility to distortion sent errors in the signal. However, the situation is by far not limited to electrical communication schemes, but may also appear in other technologies used including magnetic, optical or other wireless communication technologies.

Although these problems and the challenges that arise from the situation are by far not limited to high volume architectures and low cost implementations, in the following without a loss of generality implementations from the automotive sector will be described in more detail. Here, protocols such as SPC (Short PWM Codes; PWM=Pulse Width Modulation) and SENT (Single-Edge Nibble Transmission) may be used to transmit data. These protocols use a digital pulse width encoding for the transmission of data such as four bit nibbles. In the existing protocols the evaluation is only based on falling edges.

Although in the following a SPC- or SENT-based communication protocol will be described in which nibbles (4 bits) are transmitted in PWM encoding as datum, embodiments are by far not required to use as a datum a nibble comprising four bits. In principle, the datum transmitted or received by a transmitter or a receiver, respectively, is neither restricted to a nibble nor to a datum comprising $2^n$ states with n being an integer equal to or larger than 0. In other words, a datum transmitted or received by a transmitter or a receiver, respectively, is by far not required to cover all states of a bit-wise representation, although the datum may be representable by a sequence of bits.

Moreover, in the following a signal will be described based on transitions between a first signal level and a second signal level and vice versa. In the SPC- or SENT-based protocols falling edges will be used to encode the datum. However, in other embodiments also rising edges may be used. As a consequence, in the following description reference will mainly be made to transitions in a first or second direction, wherein—depending on the implementation—the first direction may correspond to a falling edge or a rising edge, whereas the second direction being different from the first direction corresponds to the other of the two edges.

In the standard SENT- or SPC-based messages a CRC (Cyclic Redundancy Check) checksum with N bits is used overall bits of the message. Embodiments may allow evaluating falling and rising edges in order to detect faults or errors in a signal, which are generated by noise or distortions of the signals in the channel.

The communication may be uni-directional, but also bi-directional allowing an exchange of data, commands, status information or the like. In the following description information to be transmitted from one component or entity to another component or entity will be referred to as data irrespective of the content or the meaning of the respective pieces of information.

FIG. 1 shows a simplified block diagram of a communication system 100 comprising a receiver 110 and a transmitter 120, which are interconnected by a communication link 130. The communication link may allow a uni-directional communication only from the transmitter 120 to the receiver 110 or may allow an exchange of data between the transmitter 120 and the receiver 110, which may be implemented in this case as transceivers. Concerning the technology used for the communication link and, hence, for the transmitter 120 and the receiver 110 in principle any technology allowing transmitting and receiving data may be used. Hence, the link 130 may be a bi-directional link. For instance, the communication link 130 may be based on an electric transmission of data, although other techniques including, for instance, optical, magnetic or wireless transmission schemes may be used.

The transmitter 120 comprises a transmitter circuit 140, which is designed and capable of generating the signal to be transmitted from the transmitter 120 to the receiver 110. This may, depending on the implementation, include determining time periods between transitions of the signal, durations between transitions and signal levels depending on the concrete protocol used. Accordingly, the receiver 110 includes a receiver circuit 150, which is designed and capable of receiving the signal and to determine time periods, durations, signal levels and other signal-related parameters. The receiver 110 further includes an error detection circuit 160, which is capable of generating an error indicating error signal when a predetermined verification relationship is not fulfilled or an error indicting situation occurs. Examples will be described in more detail below.

The receiver circuit 150 may be capable of receiving a transmitted signal and determining a first transition of the signal in a first direction of the signal, a second transition of the signal in a second direction, a third transition of the signal after the second transition in the first direction and the fourth transition in the second direction of the signal. The first, second, third and fourth transitions may be successive, i.e. no other transitions are determined by the receiver circuit between the first and second transitions, the second and the third transitions and the third and fourth transitions, respectively. Moreover, the receiver circuit may be adapted to determine the first time period between the first and third transitions and to determine a second time period between the second and fourth transitions. Moreover, the receiver circuit may be capable of determining a datum, such as a data value of a nibble, based on at least one of the first time period and the second time period. For determining the datum, a time base may be used by the receiver which is deducted from a synchronization pulse previously transmitted from the transmitter to the receiver. For example, the synchronization pulse may be transmitted previous to a respective frame or within each frame. The transmitted synchronization pulse indicates a time base used by the transmitter for encoding the data to be transmitted into pulse lengths. The synchronization pulse may include a predetermined number of clock ticks such as for example 56 clock ticks.

The error detection circuit may be capable of generating the error indicating error signal, if the determined first and second time periods do not fulfil the previously mentioned predetermined verification relationship. Similarly, the transmitter circuit 140 of the transmitter 120 may be capable of determining a first time period and a second time period based on the datum to be transmitted and based on the predetermined verification relationship between the first and second time periods. The transmitter circuit 140 is in this case further adapted to generate the signal comprising the previously mentioned transitions in the respective directions wherein the first and third transitions are separated from one another by the first time period and the second and fourth transitions are separated from one another by the second time period.

However, the receiver 150 may be capable of receiving a transition in the first direction and a second transition in the second direction following the first one and to determine a duration between these two transitions. In this case, the error detection circuits 160 may be capable to generate the error indicating error signal, when a predetermined value and the determined duration essentially deviate from one another. The predetermined value may optionally be a fixed value, a changeable value or a programmable value. Depending on the implementation, the error detection circuit 160 may be capable of obtaining the predetermined value by reading the value from a storage location 170. The storage location 170 may be part of the error detection circuit 160 or implemented as a part of another device or at least part of another circuit. For instance, the storage location 170 may be part of a larger memory or a larger memory circuit of the receiver 110 to name just one example.

The predetermined value may, for instance, be based on a calibration. The error detection circuit 160 may be capable of at least one of calibrating and re-calibrating the predetermined value during operation of the receiver. This may, for instance, be implemented by using a low pass filter. The low pass filter may comprise a moving average filter or another FIR filter (finite impulse response filter). However, also other averaging filters may be implemented, for instance, in the form of an infinite impulse response (IIR) filter and an accumulate-and-dump decimation FIR filter. Furthermore, nonlinear filters like a tracking filter may be used, which allow slewing updates by (+1) or (−1) step only. The low pass filter may also comprise a long-time decimating average filter taking at least $2^n$ transitions into account. Here, n may be an integer larger than 4, 5, 6, 7, 8, 9 or 10. The longer the long-time moving average filter is (larger n), the more accurate determining distortions in the timing of the transitions may be detectable. However, correspondingly the time before the error detection circuit operates reliably may also increase. Based on a decimating filter, the low pass filter may allow a more hardware efficient implementation.

It should be noted that in the case of a receiver determining only the duration between transitions in opposite directions, it may be possible to implement a communication system 100 according to an embodiment without implementing a transmitter 120 according to an embodiment.

However, also in this situation the receiver 110 and its receiver circuit 150 may be adapted to receive at least the third transition in the first direction, to determine a first time period between the first and third transitions, which are both directed along the first direction. The receiver circuit may then determine the datum to be received based on the determined time period between the first and second transitions. The respective time period may be variable and depending on the datum. In some embodiments the receiver circuit 150 may be capable to determine the duration with at least a higher precision than a size of quantization step used by the receiver circuit 150 for determining the datum based on the first time period.

The receiver circuit 150 may further be adapted to also receive and process a fourth transition in the second direction after the third transition and the determined further duration between the third and fourth transitions. In this case, the error detection circuit 160 may be adapted to generate the error indicating error signal, when the determined further duration and the predetermined value or a further predetermined value essentially deviate from one another. The third transition may be directly subsequent to the second transition. If neither the duration nor the further duration violates the previously mentioned condition, the error detection circuit 160 will not generate an error indicating error signal, but a signal indicating the absence of an error.

In the case the receiver circuit 150 is implemented to determine the previously mentioned first and second time periods and the error detection circuit verifies if the predetermined verification relationship is fulfilled, the error indicating error signal will be generated if the predetermined verification relationship is not fulfilled. It may be fulfilled, when a ratio of the determined first and second time periods with respect to one another assume a predetermined ratio value or fall within a predetermined range of ratios. For instance, the verification relationship may be fulfilled, when the two time periods are essentially equal. This may be the case, when the time periods do not deviate from one another by more than 5%, or more than 2%, or other predetermined values.

To allow an easier determination of the transitions, the receiver circuit 150 may be implemented to receive the first and third transitions in the first direction as transitions from a common predefined first signal level to a common predefined second signal level. Similarly, the receiver circuit 150 may recognize the second and fourth transitions as the respective transitions, if they are transitions from a common predefined second signal level to a common predefined first signal level.

The receiver circuit 150 may also be capable to determine at least one of the respective time periods with a higher precision than a size of a quantization step used by the receiver circuit 150 to determine the datum based on the respective time period. When the error detection circuit 160 does not recognize a violation of the predetermined verification relationship, the error signal may be generated not to indicate an error.

In the case the receiver 110 is capable of verifying both, the predetermined verification relationship as well as the error indicating situations with respect to the one or more determined durations, the mentioned error signals may be different error signals, for instance, a first and a second error signal, or it may be a common error signal generated by the error detection circuit 160. In this case, the error signal indicating an error may be generated when at least one of the previously mentioned conditions indicating an error is present (OR-combination).

Figure 2:
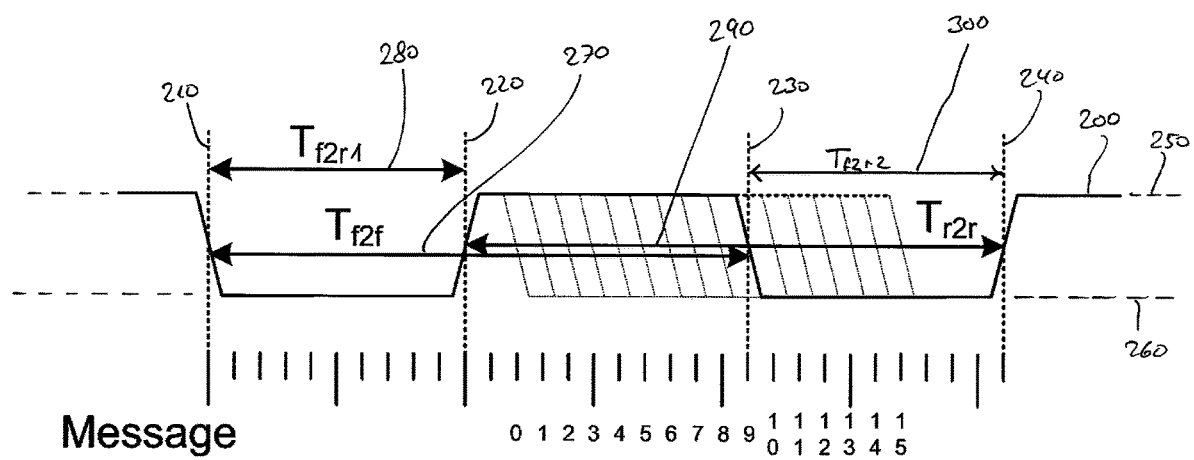
FIG. 2 illustrates a signal generated by a transmitter according to an embodiment or to be received by a receiver according to an embodiment.

FIG. 2 shows a timing diagram of a signal 200 comprising a first transition 210, a second transition 220 after the first transition 210, a third transition 230 after the second transition 220 and a fourth transition 240 after the third transition 230. To be specific, in the embodiment depicted here, the second transition directly or immediately follows the first transition. The third transition 230 and the fourth transition 240 also directly or immediately follow the second transition 220 and the third transition 230, respectively. The first and third transitions 210, 230 are transitions in a first direction, which corresponds in the examples depicted here to transitions from a common first signal level 250 to a common second signal level 260. The first signal level 250 is in this embodiment higher than the second signal level 260 so that the first direction corresponds to a falling edge. The second direction opposite to the first direction corresponds here to rising edges. In other examples and embodiments, the directions may be reversed, i.e. the first direction may be a falling edge and the second direction may be a rising edge.

In the previously mentioned communication protocols according to SPC or SENT, the datum (nibble) is encoded in a first time period 270 between the first transition 210 and the third transition 230, which are directed both along the first direction. Since in the example depicted in FIG. 2 the first direction corresponds to falling edges, the first time period 270 is also referred to as $T_{f2f}$ (f2f=falling edge to falling edge). According to the previously mentioned standards, the datum comprising four bits and, hence, sixteen different states of values (0, 1, . . . , 15) are encoded by dividing the time scale into ticks or bit times as indicated in the lower part below the signal 200 in FIG. 2. The value 0 of the datum corresponds in these protocols to 12 ticks. Based on this offset (12 ticks) the values to be transmitted are added in terms of ticks to this offset. In other words, the value 1 corresponds to 13 ticks, the value 2 to 14 ticks, the value 7 to 19 ticks and the value 15 to 27 (=12+15). Moreover, the standards define that a duration 280 between the first transition 210 and the second transition 220 corresponding in the example to a low time of the signal 200 comprises at least 4 ticks of 4 bit times. Due to the orientation of the transitions 210, 220, the duration 230 is also referred to as $T_{f2r1}$ (f2r1=falling edge to rising edge 1).

Apart from the first time period 270, also a second time period 290 between the second and the fourth transitions 220, 240 and a further duration 300 between the third and fourth transitions 230, 240 may be determined by the receiver circuit 150. Due to the orientation of the directions of the respective transitions 220, 230, 240, in FIG. 2 the second time period 290 is also referred to as $T_{r2r}$ (r2r=rising edge to rising edge) and the further duration 300 as $T_{f2r2}$ (f2r2=falling edge to rising edge 2). In some embodiments, $T_{f2r2}$ of the actually received message may be reused as $T_{f2r1}$ for the next message.

In the protocols described, the common time basis is quantized in previously mentioned ticks or bit times. Therefore, also the low time corresponding to the duration 280 according to the protocol may be restricted to an accurate value within a tolerance of n bit times, wherein n is an integer including, for instance 1, 2, 3, 4, . . . . Choosing a value of more than 4 bit times as indicating in FIG. 2 may assure the downward compatibility with the original SENT standard. A monitoring of the now accurately designed low time or duration 280 may allow to detect a shift of a length of a preceding high time by more than the defined tolerance.

As outlined, in addition it may be possible to measure the time periods or distances between two adjacent falling or rising edges, which may, for instance, be generated and defined to be equal to the time periods or distances of the following two rising edges. This represents one example of the predetermined verification relationship mentioned before. However, also other predetermined verification relationships with respect to the mentioned time periods may be implemented. For instance, the two time periods may assume with respect to each other a predetermined ratio value or fall within a predetermined range of ratios.

In case the two time periods 270, 290 are required to fulfil the predetermined verification relationship, any of these time periods may be used to encode the datum or to decode a received datum. However, if these two time periods are not required to fulfil the verification relationship, anyone of these may be used to transmit the datum.

Figure 3:
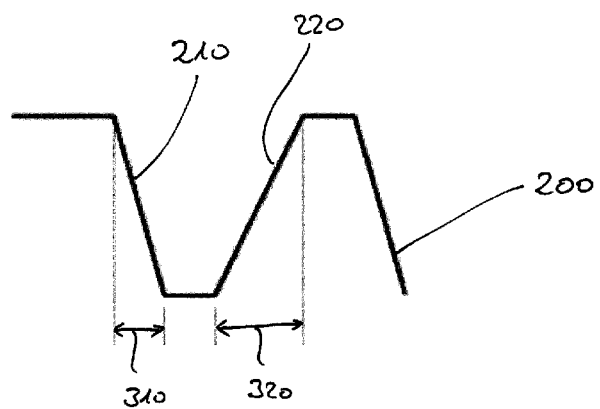
FIG. 3 illustrates possible asymmetries of transition s in the first and second direction in some implementations.

As illustrated in FIG. 3, the transitions of a signal 200 may be asymmetric. For instance, a fall time 310 of the first transition 210 depicted in FIG. 3 may be shorter than the following rise time 320 of the following second transition 220. According to the previously mentioned protocols, a maximum fall time may be, for instance, 6.5 µs, while the maximum rise time 320 may be 18.0 µs. As a consequence, to allow a more easy determination of the time periods 270, 290 it may be advisable to use transitions in the same direction. This may allow a more accurate determination and, hence, more accurate verification if an error caused, for instance, by distortion has occurred.

Figure 4:
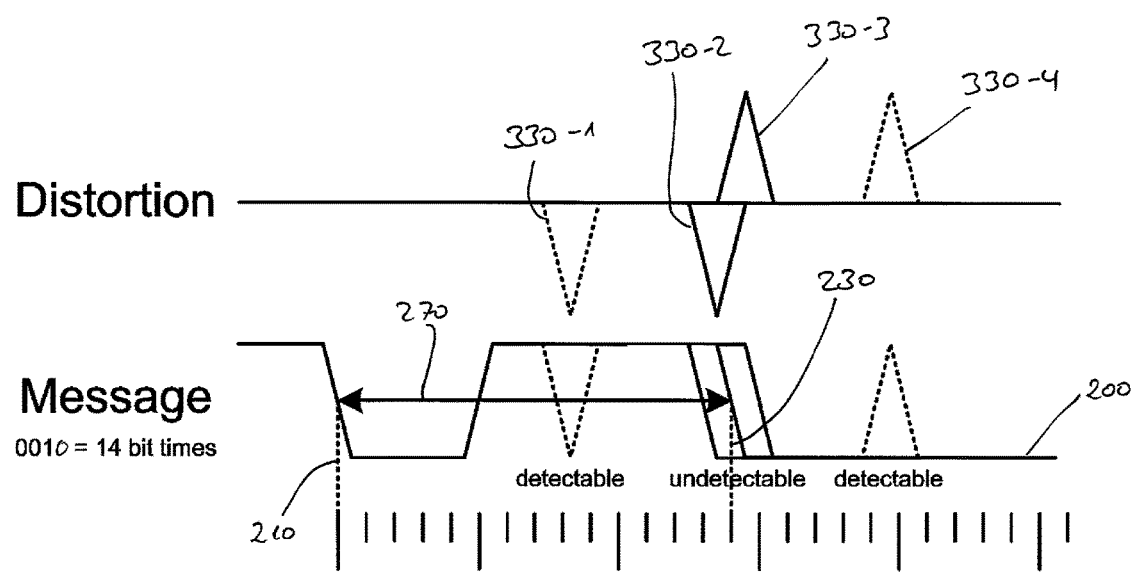
FIG. 4 illustrates different distortions with respect to the signal.

FIG. 4 illustrates the effect of distortions on the signal 200. Although due to the varying length of the overall signal 200 not comprising a fixed length, the encoding is not a PWM in the strict understanding, the transmission scheme described may sometimes also be referred to as PWM nibble transmission. In the lower part of FIG. 4, the signal 200 is depicted with a first time period 270 and the corresponding first and third transitions 210, 230. The transmitter 120 generates in the example the signal 200 with the first time period 270 of 14 bit times or ticks, which corresponds to the value 2, which equal to the bit sequence 0010. However, distortions such as depicted in the other part of FIG. 4 may be superimposed causing deviations in the signal 200. In other words, a faulty signal may be created by overlaying the distortions including, for instance, noise and electromagnetic interferences (EMI) with the original message. FIG. 4 illustrates this using four different distortions 330-1, 330-2, 330-3 and 330-4.

For the case that the distortions 330 are shorter than the shortest time periods that are specified by the protocol timing, it can be detected by a timing infringement as long as it does not appear in the proximity of the timing relevant edge. For instance, in the case of the distortion 330-1 the previously defined time period of 12 ticks is violated so that the superimposed signal received by the receiver 110 can be recognized as being faulty. Furthermore, the distortion 330-4 causes the falling edge, which is also not separated from the third transition 230 by the minimum time defined, which is in the example here 12 ticks. Therefore, also the fourth distortion 330-4 depicted in FIG. 4 can be determined by a timing violation verification.

However, for the cases that the distortions appear in the critical time region, they can cause a pull in or a delay of the edges and thus mimicry valid message, which can only be detected by the subsequently described timing evaluation. For instance, the distortion 330-2 may cause the signal 200 to comprise the third transition 230 to early compared to the originally encoded datum. Similarly, the distortion 330-3 may cause the third transition 230 to move further into time prolonging the determined first time period 270 as determined by the receiver 110. Both distortions 230-2, 230-3 may eventually not be detectable.

For the case that an overlaid pulse has a length that exceeds the minimum of the specified pulse length, the distorting pulse may at least be detectable by a timing infringement as described. Or it would generate a wrong number of nibbles in a frame or violate the CRC checksum if implemented. However, in order to detect faults that are not detected by such timing infringement, it may be possible to measure the time periods 270, 290 and at least one of the durations 280, 300 or even all time periods and durations (all falling and rising edges) and calculate the times that are defined in the sketch of a signal depicted in FIG. 2. This may be done by starting with each transition in the first direction corresponding in the example depicted in FIG. 2 to a falling edge.

The following FIGS. 5 to 12 show different scenarios in which distortions influence the signal leading to errors of fault. With respect to the following figures it will be outlined in more detail, which evaluations of the captured timings including the time periods and durations allow to detect errors in the structure of the datum transmission. FIGS. 5 to 8 show in this context possible single fault events, while FIGS. 9 to 12 illustrate the impact of double-fault events. The impact of different distortions 330 are indicated in the FIGS. 5 to 12 by errors in the transitions 210, 220, 230, 240 affected by the respective distortion(s). However, all the examples depicted in these figures are based on the situation shown in FIG. 2. As a consequence, reference is hereby made to FIG. 2 with respect to the signal 200 and its structure.

Figure 5:
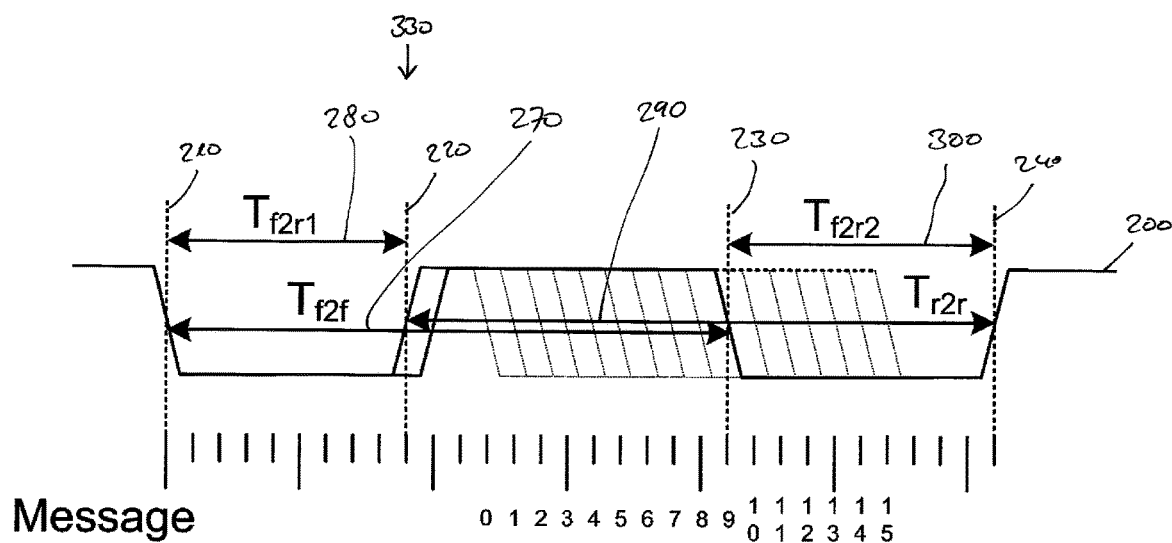
FIG. 5 illustrates a first scenario of a distorted signal detectable by a receiver according to an embodiment.

In FIG. 5 a situation is shown in which a distortion 330 causes the second transition 220 to be moved to an early point in time causing the second time period 290 to become longer. As a consequence, the first time period 270 is shorter than the second time period 290 such that the predetermined verification relationship with respect to these time periods is not fulfilled. Moreover, duration 280 becomes smaller than the predefined value corresponding in the example depicted in FIGS. 2 and 5 to 12 to 10 ticks or 10 bit times. In FIGS. 5 to 12 the predefined value is also referred to as default or default value.

Figure 6:
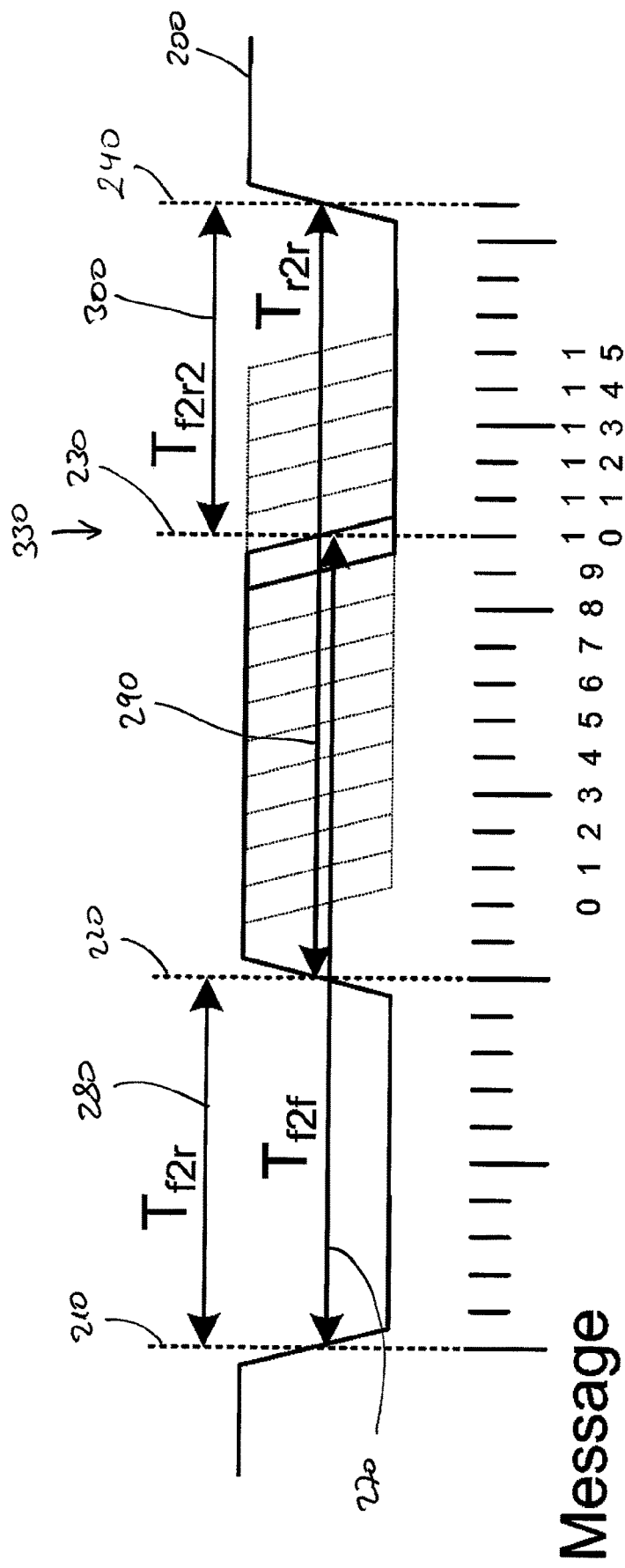
FIG. 6 illustrates a second scenario of a distorted signal detectable by a receiver according to an embodiment.

FIG. 6 illustrates the situation where the distortion 330 influences the third transition 230 to be delayed compared to the situation depicted in FIG. 2. As a consequence, the first time period 270 is longer than the second time period 290 such that again the predetermined verification relationship is violated. Moreover, the further duration 300 is smaller than the predefined value.

Figure 7:
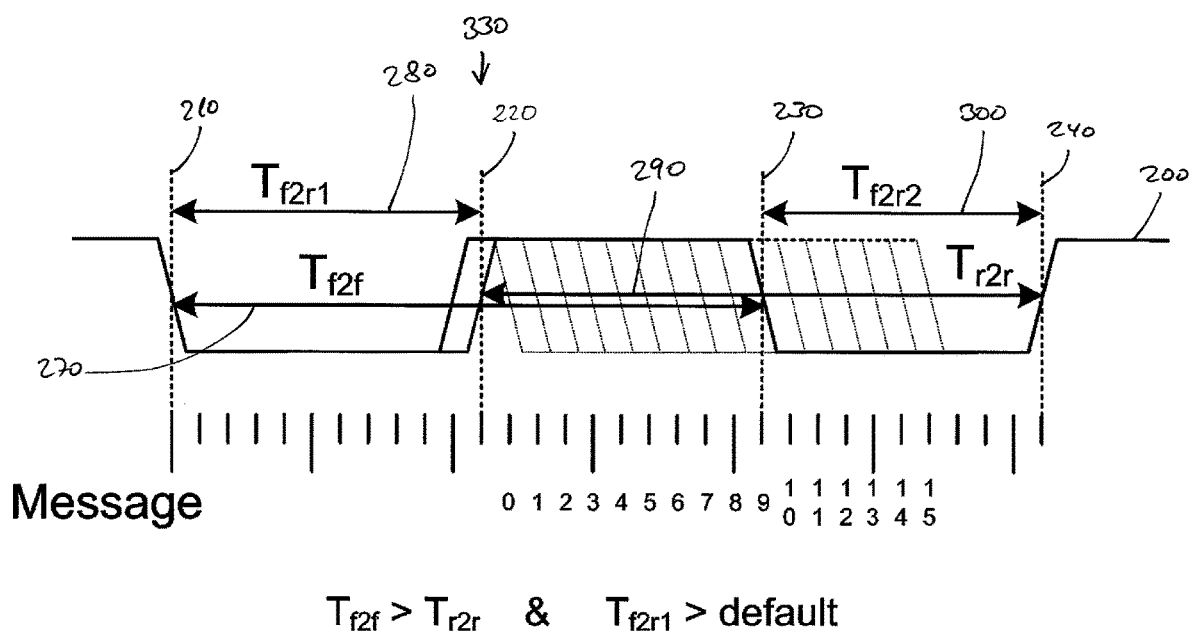
FIG. 7 illustrates a third scenario of a distorted signal detectable by a receiver according to an embodiment.

In the situation depicted in FIG. 7, the first transition 220 is influenced such that the second transition 220 is moved back 1 tick. Therefore, the first time period 270 becomes larger than the second time period such that the predetermined verification relationship between these time periods is not fulfilled. Furthermore, the duration 280 is larger than the predefined value and, hence, deviates from a predefined value such that this error indicating situation can be recognized by the receiver 110.

Figure 8:
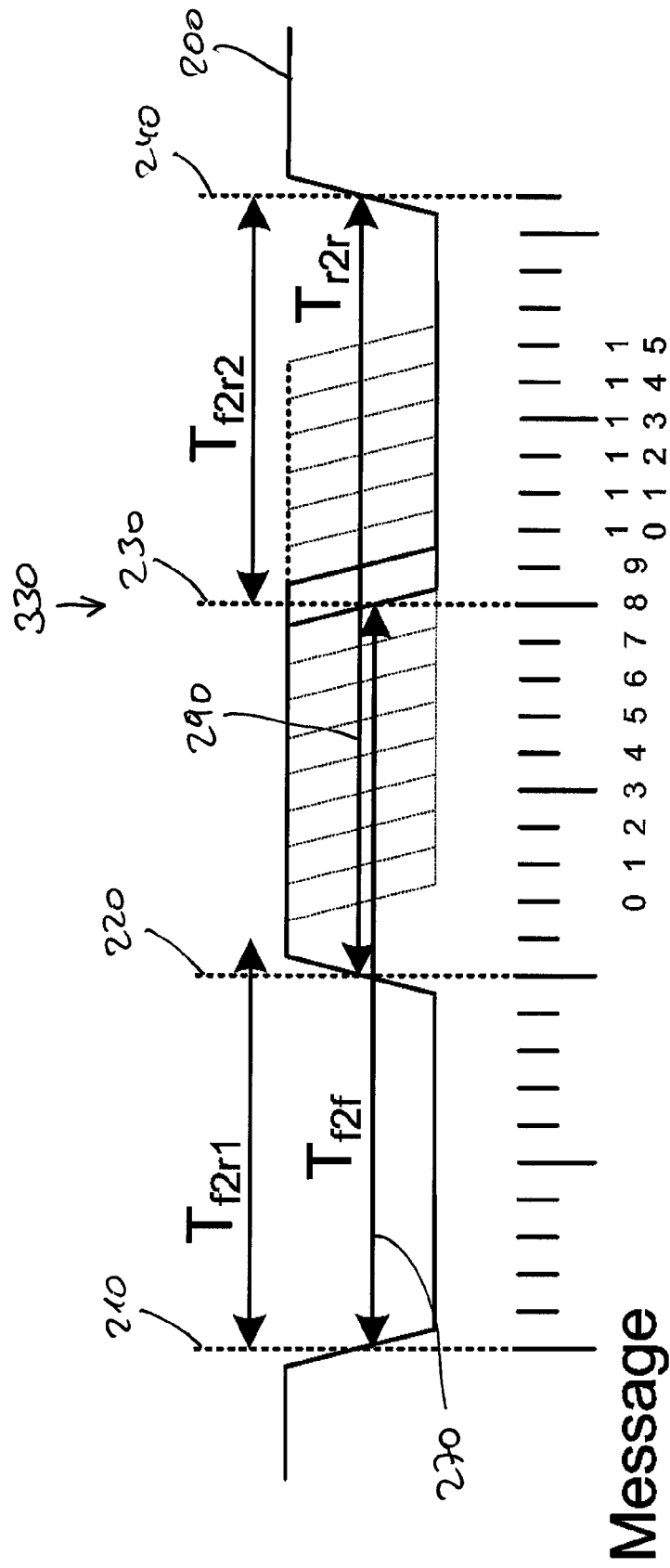
FIG. 8 illustrates a fourth scenario of a distorted signal detectable by a receiver according to an embodiment.

In the situation depicted in FIG. 8, the distortion 330 causes the third transition 230 to be 1 tick earlier. As a consequence, the first time period 270 becomes shorter than the second time period 290 violating the predetermined verification relationship. Similarly, the further duration 300 is larger than the predefined value.

Figure 9:
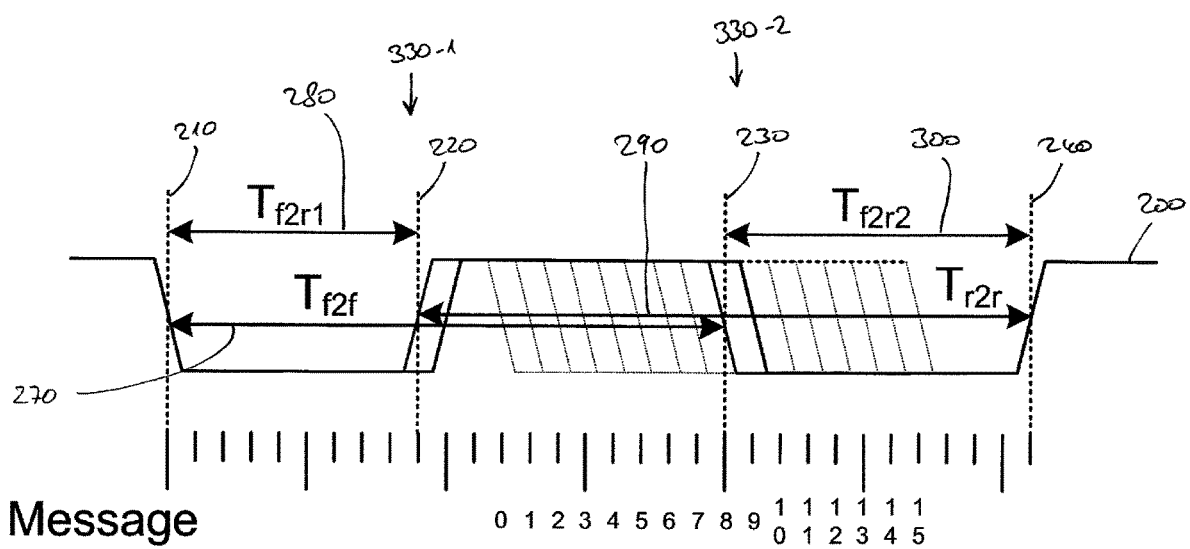
FIG. 9 illustrates a fifth scenario of a distorted signal detectable by a receiver according to an embodiment.
Figure 10:
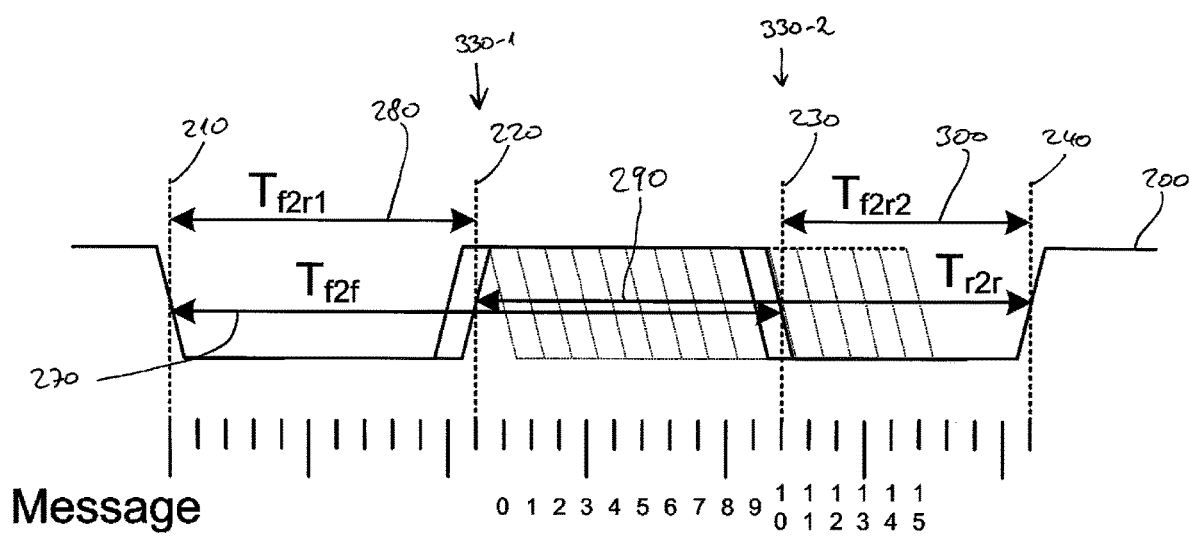
FIG. 10 illustrates a sixth scenario of a distorted signal detectable by a receiver according to an embodiment.

FIG. 9 shows a first scenario comprising a possible double-fault situation. Here, two distortions 330-1, 330-2 influence both, the second transition 220 and the third transition 230, respectively. To be more specific, the distortions 330-1 and 330-2 cause the second transition 220 and the third transition 230 to appear early by 1 tick. As a consequence, the first time period 270 is shorter than the second time period 290 violating again the predetermined verification relationship. Moreover, duration 280 is smaller than the predetermined value, while the further duration 300 is larger than the predetermined value. All these conditions may cause the error detection circuit 160 to generate an error indicating error signal.

In the situation depicted in FIG. 10, again two distortions 330-1, 330-2 influence both, the second transition 220 and the third transition 230, respectively. Here, the distortions 330-1 and 330-2 cause the second transition 220 and the third transition 230, respectively, to be late by 1 tick. Therefore, the first time period 270 is larger than the second time period 290 causing the predetermined verification relationship to be violated. Moreover, the further duration 300 is smaller than the default value and the duration 280 is larger than the predetermined value indicating also the presence of an error situation.

Figure 11:
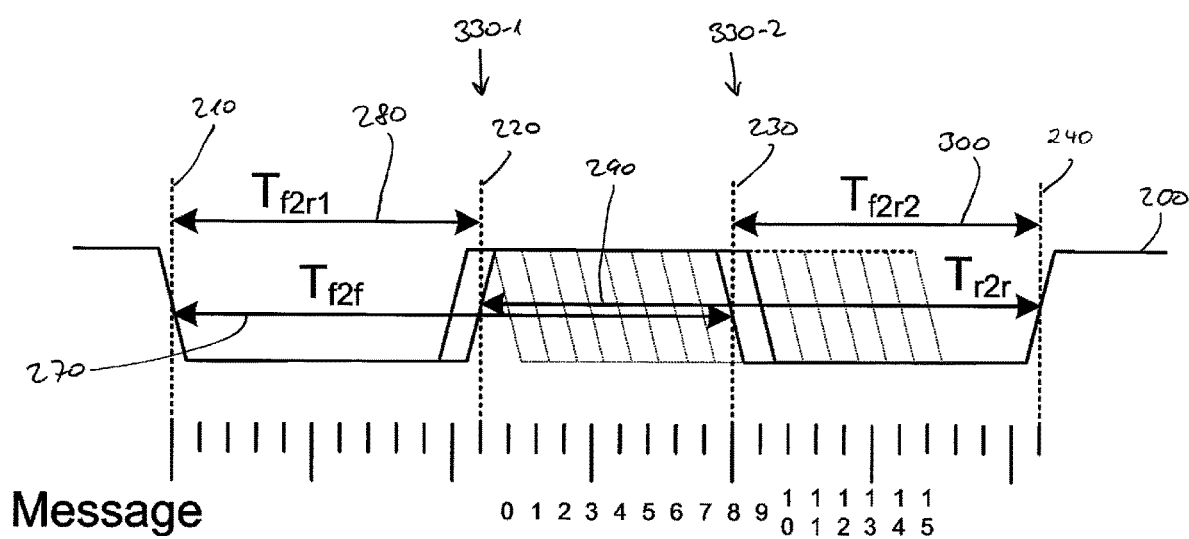
FIG. 11 illustrates a seventh scenario of a distorted signal detectable by a receiver according to an embodiment.

FIG. 11 illustrates a further double-fault situation, in which again two distortions 330-1, 330-2 influence the positions of the second and third transitions 220, 230, respectively. However, in this situation here the distortions 330 both cause the resulting pulse to be shorter than intended. To be specific, distortion 330-1 causes the the second transition 220 to be moved down by 1 tick, causing the transition 220 to be late compared to the situation depicted in FIG. 2. The second distortion 330-2 causes the third transition 230 to be moved up 1 tick, causing the transition 230 to be early compared to its intended position as shown in FIG. 2. The resulting pulse between the second and third transitions 220, 230 is shorter than intended. As a consequence, the first and second time periods 270, 290 are still identical not violating the predetermined verification relationship. In other words, in this situation depicted in FIG. 11 the predetermined verification relationship is fulfilled. However, the duration 280 as well as the further duration 300 is larger than the predefined value indicating, hence, the presence of a fault or error situation. In this case, the error detection circuit 160 can still identify the presence of a fault.

Figure 12:
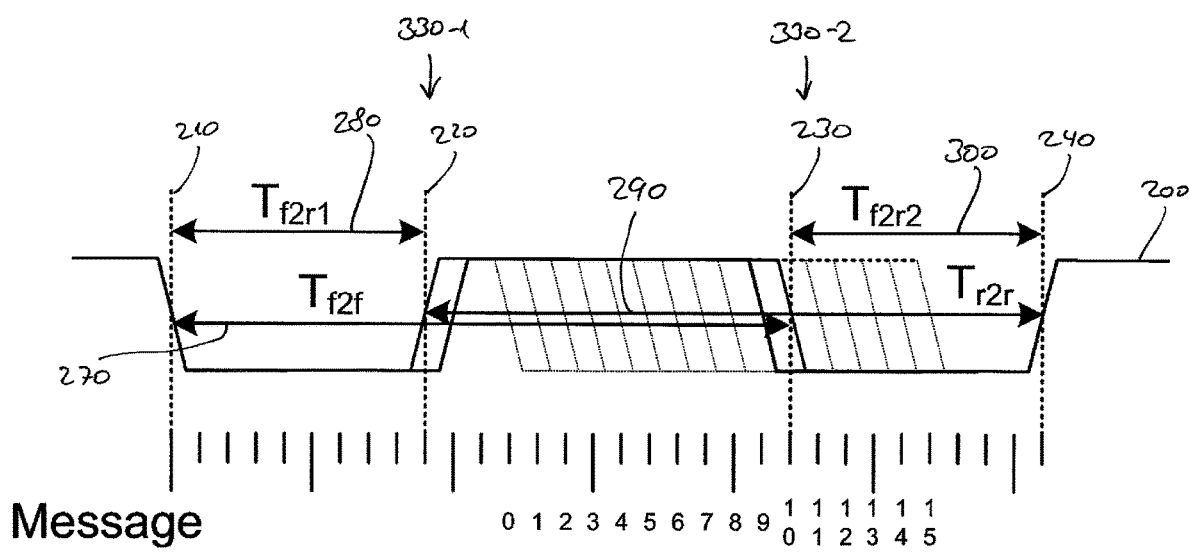
FIG. 12 illustrates an eighth scenario of a distorted signal detectable by a receiver according to an embodiment.

Finally, in FIG. 12 a further double-fault situation is illustrated, in which two distortions 330-1, 330-2 influence the positions of the second and third transitions 220, 230, respectively. Here, the distortions 330 cause the second transition 220 to be moved up by 1 tick, causing the second transition 220 to be early, while the third transition 230 is moved down by 1 tick, causing the third transition 230 to be late. The resulting pulse between the second and third transitions 220, 230 is longer than intended. As a consequence, the two time periods 270, 290 are once again equal such that the predetermined verification relationship is still fulfilled. However, the durations 280, 300 are both smaller than the predefined value such that the receiver 110 comprising the error detecting circuit 160 can still detect the presence of the false and, hence, generate a corresponding error indicating error signal.

As shown before, the timing evaluations of a transmitted pattern include rising and falling edges or—in more general terms—transitions along both the first and second directions. Evaluating the timings of these edges may allow detecting single and dual faults of a datum to be transmitted. Since triple and higher order faults can be constructed by combining single and double faults of two adjacent nibbles or data, they may be detectable within at least one of the data.

As described before, on top of the above described timing evaluations, a comparison of constant timing periods which are generated by the same transmitter (for example a same sensor or a same communication interface of multiple sensors) can be detected if they deviate from each other by more than a defined limit. This can be applied, for instance, to the low time gaps or durations 280, 300 the beginning of each nibble. Moreover, it may be applied to a reference pulse of the beginning of each message, which is used to provide the sensor time base of a transmitter such as a sensor to the receiver 110, for instance, an electronic control unit.

Safety features and protocol specifications may be adapted to a specific application. Extending the length of the checksum on each message may be alternatively implemented. However, this may infringe the data requirements and may be counterproductive when trying to improve the previously mentioned trade-off. For instance, on low data rate sensor busses this may represent an alternative. Implementation may be more complicated and also violation of upwards compatibility with existing standards may be considered when implementing such features.

Figure 13:
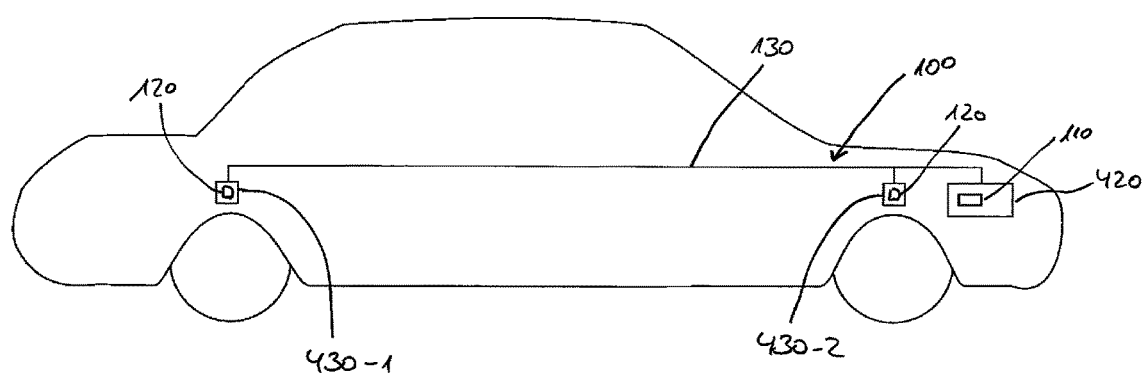
FIG. 13 shows simplified block diagram of a vehicle according to an embodiment comprising a communication system according to an embodiment.

FIG. 13 shows a simplified block diagram of a vehicle 400, which may, for instance, be a car 410. The vehicle 400 or car 410 comprises a communication system 100 comprising a control unit 420, which is also referred to as a controller. The control unit 420 comprises a receiver 110 as previously described.

Furthermore, the vehicle 400 comprises one or more sensors 430, each of which may comprise a transmitter 120 according to an embodiment, although this is by far not required as outlined before. To be a little more precise, the car 410 depicted in FIG. 13 comprises a first sensor 430-1 and a second transistor 430-2, which may be real speed sensors for an entire-lock breaking system (ABS) or a traction control system (TCS) to name just one example. Other sensors 430 and more than one control unit 420 may also be used.

The sensors 430 and the control unit 420 are coupled to each other via a communication link 130, which may be implemented as a bus. In other cases instead of a bus individual signal lines or another communication system may be implemented. In other words, embodiments may, for instance, comprise SPC-sensor interfaces allowing an improved safety level by a timing evaluation.

Figure 14:
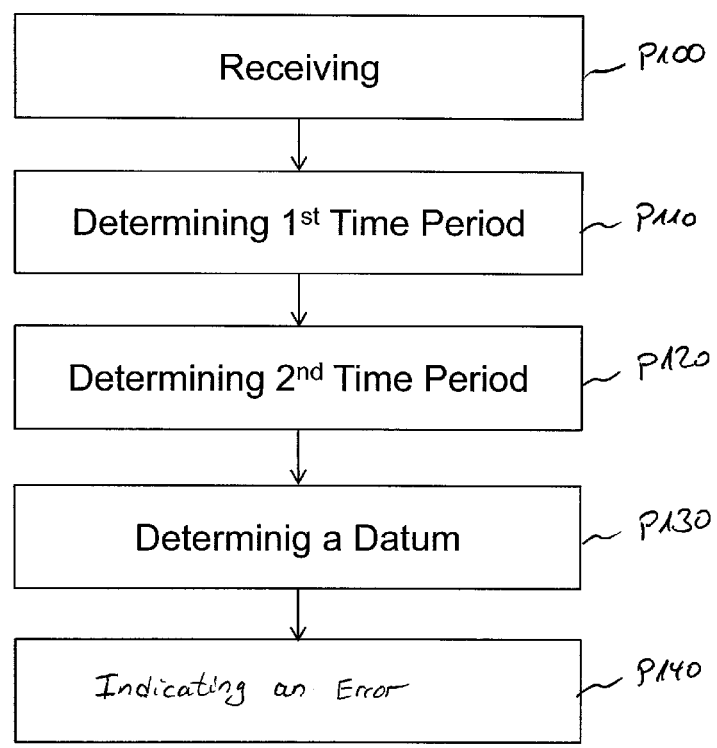
FIG. 14 shows a flowchart of a method for detecting an error in a signal comprising a datum according to an embodiment.

FIG. 14 shows a flowchart of a method for detecting an error in a signal comprising a datum. In a process P100 a signal 200 may be received, wherein the signal comprises the first, second, third and fourth transitions 210, 220, 230, 240 as previously described. In a process P110, the first time period 270 may be determined. In a process P120, the second time period 290 may be determined. In an optional process P130 based on at least one of the first and second time periods 270, 290 the datum to be transmitted may be determined. In a case the predetermined verification relationship between the time periods 270, 290 is not fulfilled, in the process P140 an error is indicated.

Figure 15:
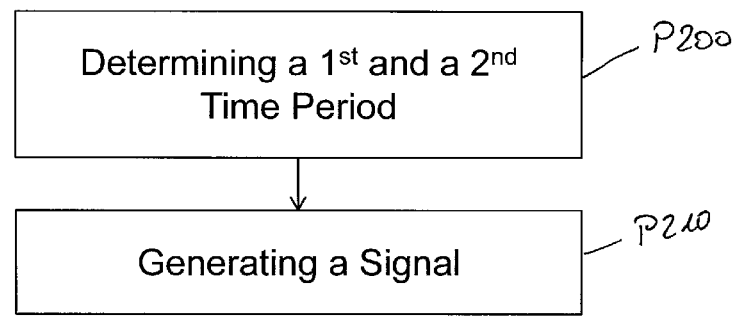
FIG. 15 shows a flowchart of a method for transmitting a datum according to an embodiment.

FIG. 15 shows a flowchart of a method for transmitting a datum according to an embodiment. In a process P200 a first time period and a second time period are determined based on the datum to be transmitted and based on a predetermined verification relationship between the two time periods. In a process P210 a signal is generating comprising a first transition in a first direction, a second transition after the first transition in a second direction, a third transition after the second transition in the first direction and a fourth transition in the second direction of the signal, wherein the first transition and the third transition are separated from one another by the first time period and wherein the second transition in the fourth transition are separated from one another by the second time period.

Figure 16:
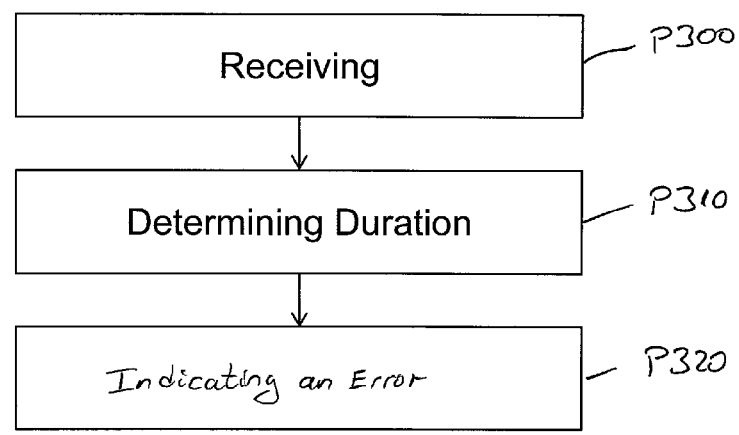
FIG. 16 shows a flowchart of a method for detecting an error in a signal according to an embodiment.

FIG. 16 shows a flowchart of a method for detecting an error in a signal according to an embodiment. The method comprises in a process P300 receiving a signal comprising a first transition in a first direction and a second transition after the first transition in a second direction. In a process P310, a duration between the first and second transitions is determined. In a process P320 an error is indicated error, if a predetermined value and the determined duration essentially deviate from one another.

It should be pointed out that the sequence of processes as depicted in the figures and described above as well as below does not imply a required order of these processes. These processes may be varied in terms of their order as well as the sequence of their processing. For instance, they may be executed timely overlapping or even in parallel. Moreover, they may be executed in a loop, until, for instance an aboard or exit condition is met.

Moreover, examples and embodiments may also comprise a computer program having a program code for performing any of the above or below described methods, when the computer program is executed on a computer, a processor or another programmable hardware including, for instance, a controller or a control unit.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The methods described herein may be implemented as software, for instance, as a computer program. The sub-processes may be performed by such a program by, for instance, writing into a memory location. Similarly, reading or receiving data may be performed by reading from the same or another memory location. A memory location may be a register or another memory of an appropriate hardware. The functions of the various elements shown in the Figures, including any functional blocks labeled as "means", "means for forming", "means for determining" etc., may be provided through the use of dedicated hardware, such as "a former", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective processes of these methods.

Further, it is to be understood that the disclosure of multiple processes or functions disclosed in the specification or claims may not be construed as to be within the specific order. Therefore, the disclosure of multiple processes or functions will not limit these to a particular order unless such processes or functions are not interchangeable for technical reasons. Furthermore, in some embodiments a single process may include or may be broken into multiple sub-processes. Such sub-processes may be included and part of the disclosure of this single process unless explicitly excluded.

What is claimed is:

1. A receiver, comprising:
   a receiver circuit to receive a pulse width encoded signal having a first transition in a first direction, a second transition after the first transition in a second direction, a third transition after the second transition in the first direction and a fourth transition in the second direction of the signal, wherein the receiver circuit is adapted to determine a first time period between the first and third transitions and to determine a second time period between the second and fourth transitions, and wherein the receiver circuit is adapted to determine a datum based on at least one of the first time period and the second time period; and wherein the receiver is adapted to indicate an error, if the determined first and second time periods do not fulfill a predetermined verification relationship with respect to one another.

2. The receiver according to claim 1, wherein the receiver is adapted such that the predetermined verification relationship is fulfilled, when a ratio of the determined first time period with respect to the determined second time period assumes a predetermined ratio value or falls within a predetermined range of ratios.

3. The receiver according to claim 1, wherein the receiver is adapted such that the predetermined verification relationship is fulfilled, when the first and second time periods are essentially equal.

4. The receiver according to claim 1, wherein the receiver circuit is adapted to determine the first time period based on the first and third transitions as transitions from a common predefined first signal level to a common predefined second signal level.

5. The receiver according to claim 1, wherein the receiver circuit is adapted to determine the second time period based on the second and fourth transitions as transitions from a common predefined second signal level to a common predefined first signal level.

6. The receiver according to claim 1, wherein the receiver circuit is adapted to determine the datum by processing the at least one respective time period, which is variable and depending on the datum.

7. The receiver according to claim 1, wherein the receiver is adapted to not indicate an error, if the first and second time periods fulfill the predetermined verification relationship.

8. The receiver according to claim 1, wherein the receiver circuit is adapted to determine a time basis for determining at least one of the first and second time periods based on a synchronization frame received before receiving the first, second, third and fourth transitions.

9. A method for detecting an error in a signal comprising a datum, the method comprising:

receiving a first transition in a first direction, a second transition after the first transition in a second direction, a third transition after the second transition in the first direction and a fourth transition in the second direction of the signal;

determining a first time period between the first and third transitions;

determining a second time period between the second and fourth transitions;

determining the datum to be received based on at least one of the first time period and the second time period; and indicating an error, if the determined first and second time periods do not fulfill a predetermined verification relationship with respect to one another.

10. A non-transitory computer readable medium having a computer program having a program code for performing the method of claim 9, when the computer program is executed on a computer, a processor or another programmable hardware.

* * * * *